(12) United States Patent
Chatterjee

(10) Patent No.: US 6,865,638 B1
(45) Date of Patent: Mar. 8, 2005

(54) APPARATUS AND METHOD FOR TRANSFERRING MULTI-BYTE WORDS IN A FLY-BY DMA OPERATION

(75) Inventor: Mitrajit Chatterjee, San Jose, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 401 days.

(21) Appl. No.: 10/107,503

(22) Filed: Mar. 27, 2002

Related U.S. Application Data

(60) Provisional application No. 60/316,399, filed on Aug. 31, 2001.

(51) Int. Cl.[7] .................................................. G06F 1/00
(52) U.S. Cl. ...................... 710/307; 710/308; 710/310; 710/22; 710/27; 710/52; 710/57; 711/154
(58) Field of Search ..................... 710/305–311, 33–35, 710/20–21, 52–61; 711/152, 153, 159–160

(56) References Cited

U.S. PATENT DOCUMENTS

| | | | | | |
|---|---|---|---|---|---|
| 5,027,330 | A | * | 6/1991 | Miller ......................... 365/239 |
| 5,416,916 | A | * | 5/1995 | Bayle ........................... 710/22 |
| 5,508,679 | A | * | 4/1996 | McClure .................. 340/146.2 |
| 5,559,969 | A | * | 9/1996 | Jennings ...................... 710/307 |
| 6,016,315 | A | * | 1/2000 | Chambers et al. .......... 370/378 |
| 6,055,584 | A | * | 4/2000 | Bridges et al. ............... 710/27 |
| 6,145,061 | A | * | 11/2000 | Garcia et al. ............... 711/154 |
| 6,330,623 | B1 | * | 12/2001 | Wu et al. ...................... 710/23 |
| 6,393,548 | B1 | * | 5/2002 | Kerstein et al. .............. 712/43 |
| 6,415,345 | B1 | * | 7/2002 | Wu et al. .................... 710/305 |
| 6,662,258 | B1 | * | 12/2003 | Lukanc et al. .............. 710/308 |

* cited by examiner

Primary Examiner—Paul R. Myers
Assistant Examiner—Raymond N Phan
(74) Attorney, Agent, or Firm—Victor H. Okumoto

(57) ABSTRACT

An apparatus and method for transferring multi-byte words having arbitrary start and end byte addresses are described. Data transfers between a memory and a PCI-bus pass through a PCI-side aligner unit, PCI FIFO, Endian swap logic, and PCI-bus interface unit under the control of a PCI FIFO controller. The PCI-side aligner unit properly aligns the data while communicating data with the memory's bus on a word-at-a-time basis, and communicating data with the PCI FIFO managed on a byte-at-a-time basis synchronous with a clock signal provided by the memory's bus. The Endian swap logic properly orients the data in big or little Endian orientation. The PCI-bus interface unit communicates data with the PCI-bus on a word-at-a-time basis, and communicates data with the PCI FIFO managed on a byte-at-a-time basis synchronous with a clock signal provided by the PCI-bus. To keep track of unread stored data in the PCI FIFO, the PCI FIFO controller includes a #Bytes logic unit that automatically accounts for wrap-around of write and read pointers for the PCI FIFO.

22 Claims, 3 Drawing Sheets

APPARATUS AND METHOD FOR TRANSFERRING MULTI-BYTE WORDS IN A FLY-BY DMA OPERATION

CROSS REFERENCE TO RELATED APPLICATIONS

This application claims priority to U.S. provisional application Ser. No. 60/316,399 filed Aug. 31, 2001.

FIELD OF THE INVENTION

The present invention generally relates to data transfer and in particular, to an apparatus and method for transferring multi-byte words in a fly-by DMA operation.

BACKGROUND OF THE INVENTION

Fly-by direct memory access ("DMA") read and write operations are employed to free up valuable system resources such as a central processing unit ("CPU") and DMA controller from having to extensively manage data transfers between a memory and PCI-bus. An example of such fly-by DMA operation is described in U.S. patent application Ser. No. 09/888,321 entitled "Transaction Aligner Microarchitecture" filed Jun. 21, 2001, assigned to the same Assignee as the present invention, and incorporated herein in its entirety by this reference.

Management of data transfers between a memory and a PCI-bus can be complicated, however, for a number of reasons. Although it may be desirable to manage certain functions on a byte-at-a-time basis, data transfers on the memory's bus and the PCI-bus typically use word addresses so that data are transferred on a word-at-a-time basis. Each word typically comprises multiple bytes to form multi-byte words. Valid data for multi-byte words may start and end at arbitrary byte locations in the multi-byte words. Data aligners are commonly employed since the starting and ending byte locations may be different for data communicated from and to the memory and data communicated from and to the PCI-bus. Data communicated to and from the PCI-bus may also require swapping between big and little Endian orientations. To simplify implementation, a fixed byte enable vector may be required to be provided during each burst transfer of data to the PCI-bus. Also, data transfer rates from and to the memory may not be related to data transfer rates from and to the PCI-bus.

OBJECTS AND SUMMARY OF THE INVENTION

Accordingly, it is an object of the present invention to provide an apparatus and method for transferring multi-byte words having arbitrary start and end byte addresses.

Another object is to provide an apparatus and method for transferring multi-byte words that employs a hybrid byte-at-a-time and word-at-a-time data transfer management scheme for enhanced efficiency and simplicity of implementation.

Another object is to provide an apparatus and method for transferring multi-byte words that accommodates different data transfer rates from and to the memory than from and to the PCI-bus.

These and additional objects are accomplished by the various aspects of the present invention, wherein briefly stated, one aspect is an apparatus for transferring multi-byte words in a fly-by DMA operation. The apparatus comprises a FIFO, first and second registers, and control logic. The FIFO is coupled to a memory and a PCI-bus such that the FIFO buffers multi-byte words that are transferred between the memory and the PCI-bus. The first register stores a write pointer to a next available byte location to be written to the FIFO when the multi-byte words are being transferred from the memory to the PCI-bus, and a read pointer to a next byte location to be read from the FIFO when the multi-byte words are being transferred from the PCI-bus to the memory. Conversely, the second register stores a read pointer to a next byte location to be read from the FIFO when the multi-byte words are being transferred from the memory to the PCI-bus, and a write pointer to a next byte location to be read firm the FIFO when the multi-byte words are being transfer from the PCI-bus to the memory. The control logic is configured to manage the transfer of the multi-byte words through the FIFO and shift the read and write pointers to match a starting byte address of a first multi-byte word at the beginning of a fly-by DMA operation.

Another aspect is a method for transferring multi-byte words, comprising: receiving one or more multi-byte words and a first clock signal from a first bus configured to communicate on a word-at-a-time basis; writing the one or more multi-byte words into a FIFO managed on a byte-at-a-time basis synchronous with the first clock signal; reading the one or more multi-byte words from the FIFO managed on a byte-at-a-time basis synchronous with a second clock signal received from a second bus; and transmitting the one or more multi-byte words to the second bus on a word-at-a-time basis.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
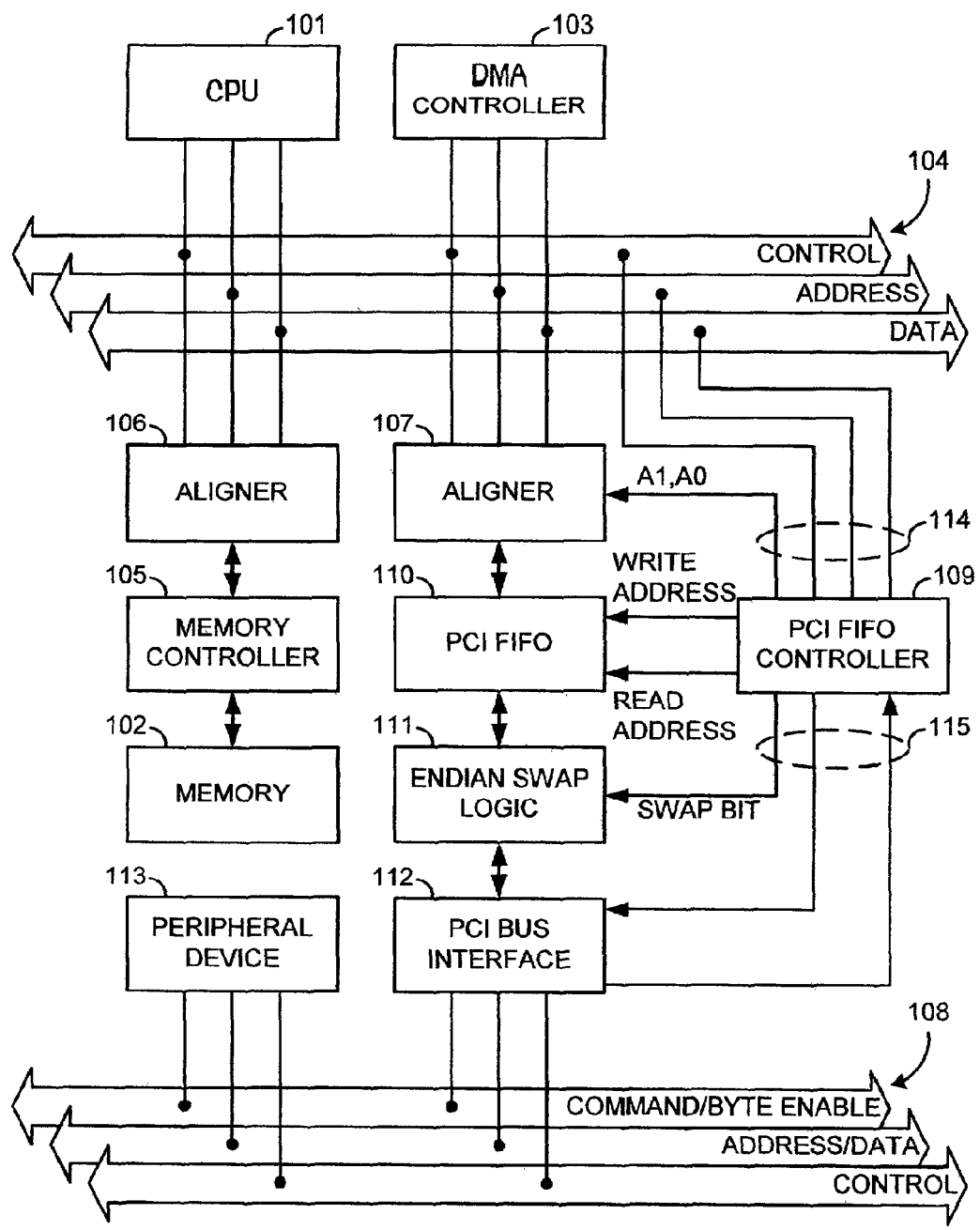
FIG. 1 illustrates, as an example, a block diagram of a computer system including an apparatus for transferring multi-byte words utilizing aspects of the present invention.

FIG. 1 illustrates, as an example, a block diagram of a computer system including a CPU 101, memory 102 and DMA controller 103 coupled through a bus 104. A memory controller 105 controls the reading and writing of multi-byte word data on a word-at-a-time basis from and to the memory 102. The multi-byte word data (also referred to herein simply as "data") in this case may have arbitrary starting and ending byte addresses as they are read from or written to the memory 102. By convention, data provided to or retrieved from the bus 104, however, should be fully left aligned. Therefore, a memory-side aligner unit 106 is included in the computer system to align the multi-byte word data read from the memory 102 so that they are fully left-aligned before providing the data to the bus 104 and conversely, to retrieve fully left-aligned data from the bus 104 and properly shift them so that they reflect correct starting and ending byte addresses before writing them into the memory 102.

Similarly, a PCI-side aligner unit 107 is included in the computer system to align multi-byte word data received from the PCI-bus 108 so that they are fully left-aligned before providing the data to the bus 104 and conversely, to retrieve fully left-aligned data from the bus 104 and properly shift them so that they reflect correct starting and ending byte addresses before they are transferred to the PCI-bus 108. Information of the starting and ending byte addresses are provided by a PCI FIFO controller 109 as least significant address bits A1, A0 of their respective PCI-bus addresses. The starting PCI-bus address is provided to the PCI FIFO controller 109 by, for example, the DMA controller 103, and subsequent PCI-bus addresses, are then determined, for example, by the PCI FIFO controller 109 as it manages the transfer of data between the bus 104 and the PCI-bus 108. Although the CPU 101, DMA controller 103, memory-side aligner unit 106, PCI-side aligner unit 107, and PCI FIFO controller logic 109 are all shown being connected to the bus 104 to simplify the present description, in a preferred embodiment of the invention, the bus 104 comprises a system bus to which the CPU 101 and memory-side aligner unit 106 are coupled, a local bus to which the DMA controller 103 and PCI-side aligner unit 107 are coupled, and a bridge circuit coupling the system bus to the local bus.

A PCI FIFO 110 buffers multi-byte words being transferred from or to the PCI-bus 108. When communicating data with the PCI-side aligner unit 107, the PCI FIFO 110 and PCI-side aligner unit 107 preferably perform such communication synchronous with a local bus clock signal provided by the bus 104. On the other hand, when communicating data with a PCI-bus interface unit 112 through Endian swap logic 111, the PCI FIFO 110 and the PCI-bus interface unit 112 preferably perform such communication synchronous with a PCI-bus clock signal provided by the PCI-bus 108. The Endian swap logic 111 responds to a swap bit provided by the PCI FIFO controller logic 109 to orient the data into either little or big Endian orientation before passing it on.

The PCI FIFO 110 operates as a circular FIFO so that writing to the PCI FIFO 110 wraps around back to the starting address after a last address in the PCI FIFO 110 has been written to. In the present example, the PCI FIFO 110 stores up to 64 4-byte words that are written in and read out on a byte-at-a-time basis under management of the PCI FIFO controller logic 109. The transfer out or reading of stored data is not initiated by the PCI FIFO controller logic 109 until at least a specified number of bytes have been stored in the PCI FIFO 110 during, for examples, a fly-by DMA read or write operation. Once such a transfer is initiated towards the PCI-bus 108, the transfer is performed in one or more burst transfers during each of which a fixed byte enable vector is provided to the PCI-bus 108. Communication of data between the PCI FIFO 110 and the PCI-side aligner 107 is managed on a byte-at-a-time basis, while communication of data between the PCI-side aligner 107 and the bus 104 is performed on a word-at-a-time basis. Similarly, communication of data between the PCI FIFO 110 and the PCI-bus interface unit 112 is managed on a byte-at-a-time basis, while communication of data between the PCI-bus interface unit 112 and the PCI-bus 108 is performed on a word-at-a-time basis.

The PCI-bus interface unit 112 communicates with the PCI-bus 108. When receiving data from the PCI-bus 108, the PCI-bus interface unit 112 passes data to the Endian swap logic 111 in response to command/byte enable, address and control information provided by the PCI FIFO controller logic 109. The PCI FIFO controller logic 109 manages the transfer of the data in this case from the PCI-bus interface unit 112 through the Endian swap logic 111 and into the PCI FIFO 110. On the other hand, when transferring data to the PCI-bus 108, the PCI-bus interface unit 112 receives command/byte enable, address and control information from the PCI FIFO controller logic 109, and data from the Endian swap logic 111. The PCI FIFO controller logic 109 manages the transfer of the data in this case to the PCI-bus interface unit 112 from the PCI FIFO 110.

Figure 2:
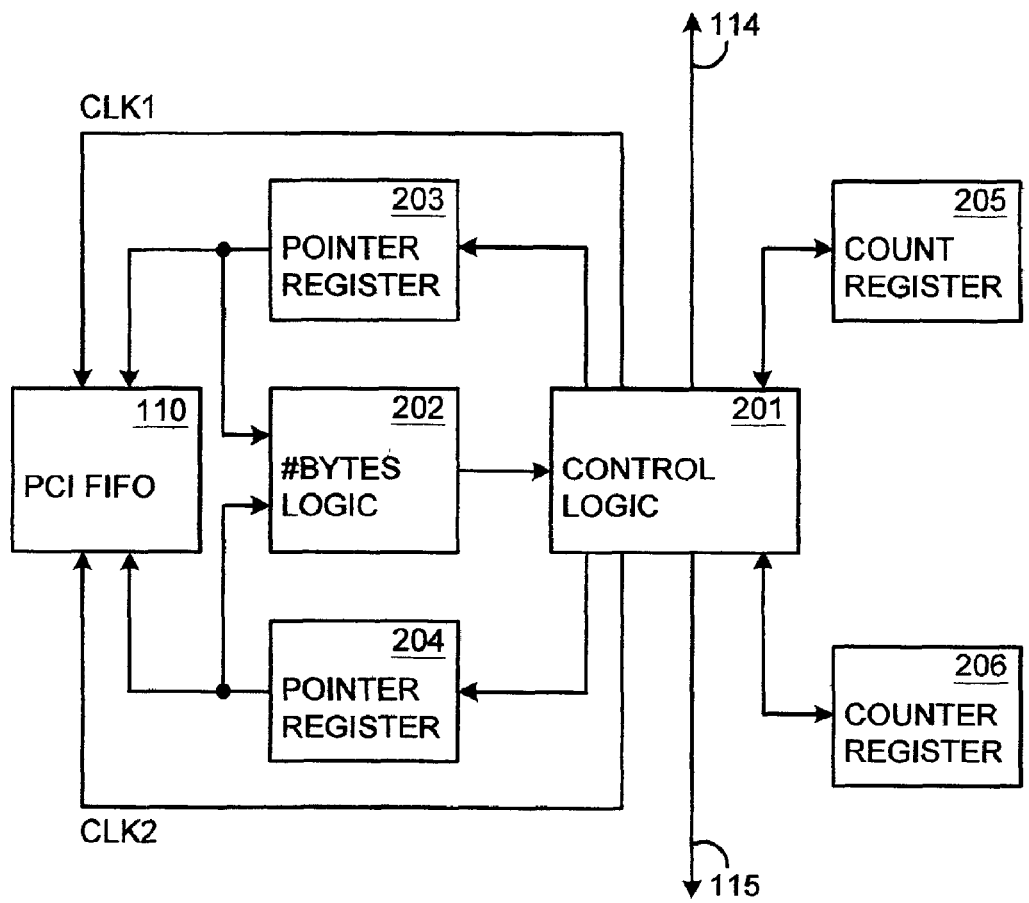
FIG. 2 illustrates, as an example, a block diagram including PCI FIFO controller logic utilizing aspects of the present invention.

FIG. 2 illustrates, as an example, a block diagram of the PCI FIFO controller logic 109 coupled to the PCI FIFO 110. There are several important registers included in the PCI FIFO controller logic 109 along with control logic 201 and #Bytes logic 202.

Two pointer registers, 203 and 204, store byte address pointers for writing to and reading from the PCI FIFO 110. When data is being transferred to the PCI-bus 108 from the memory 102, for example, in a fly-by DMA write operation, the first pointer register 203 stores a write pointer to the next byte location in the PCI FIFO 110 that is available to be written to, and the second pointer register 204 stores a read pointer to the next byte location in the PCI FIFO 110 that is to be read from. On the other hand, when data is being written to the memory 102 from the PCI-bus 108, for example, in a fly-by DMA read operation, the first pointer register 203 stores a read pointer to the next byte location in the PCI FIFO 110 that is to be read from, and the second pointer register 204 stores a write pointer to the next byte location in the PCI FIFO 110 that is available to be written to.

Upon initiation of a fly-by DMA read or write operation through the PCI FIFO 110, the control logic 201 initially resets then shifts the contents of the pointer registers 203 and 204 to indicate the starting byte address of a first multi-byte word to be transferred from (i.e., fly-by DMA read operation) or to (i.e., fly-by DMA write operation) the PCI-bus 108. Thereafter, for each byte of data written into the PCI FIFO 110, the write pointer is incremented by one (e.g., contents of register 203 during fly-by DMA read or contents of register 204 during a fly-by DMA write operation), and for each byte of data read from the PCI FIFO 110, the read pointer is incremented by one (e.g., contents of register 204 during fly-by DMA read or contents of register 203 during a fly-by DMA write operation). In this way, the starting and ending byte addresses of the write and read pointers correspond to (or match) the starting and ending byte addresses on the PCI-bus 108 for the fly-by DMA operation.

The #Bytes logic 202 keeps track of the number of unread stored bytes in the PCI FIFO 110. Since the PCI FIFO 110 is a circular FIFO, it is important to keep track of this number so overwriting of stored data can be avoided be fore the data is read out of the PCI FIFO 110.

In addition to initializing and incrementing the pointer registers 203 and 204, the control logic 201 also provides the first two bits A1, A0 of the PCI-bus address to the PCI-side aligner unit 107 so that the PCI-side aligner unit 107 knows how many bytes to shift the first byte of the first multi-byte word when passing data to the PCI FIFO 110 (e.g., during a fly-by DMA write operation), or knows the byte location of the first valid byte in the first multi-byte word when passing data to the bus 104 (e.g., during a fly-by DMA read operation).

Another function of the control logic 201 is to initiate data transfers each time after prespecified numbers of bytes have been written to the PCI FIFO 110. In order to make efficient use of the local bus 104 when transferring data to the memory 102 (e.g., during a fly-by DMA read operation) and the PCI-bus 108 when transferring data to a peripheral 113 (e.g., during a fly-by DMA write operation), data is not transferred out of the PCI FIFO 110 until these prespecified numbers of bytes have been written to the PCI FIFO 110.

After initializing the pointer registers 203 and 204, the control logic 201 does not start a transfer of data until the number of bytes written into the PCI FIFO 11Q, as indicated by the output of the #Bytes logic 202, reaches at least a first specified number, such as 64 bytes. Upon reaching that number, the control logic 201 stores the number of unread stored bytes in the PCI FIFO 110 at that time in a count register 205, initiates a data transfer request for a corresponding number of multi-byte words, and starts keeping track of additional bytes written into the PCI FIFO 110 in a counter register 206. Subsequently, when a sum of the contents of the count register 205 and the counter register 206 is at least a second specified number, such as 128 bytes, the control logic 201 initiates another data transfer request for a corresponding number of multi-byte words to the number indicated by the counter register 206 at that time, and appropriately updates the count register 205 and resets the counter register 206 so that after at least another prespecified number of bytes, such as 64 bytes, have been written into the PCI FIFO 110, another data transfer and updating of the registers 205 and 206 occurs. In this way, the control logic 201 initiates a data transfer from the PCI FIFO 110 either each time approximately 64 bytes (or 16 or 17 4-byte words, depending upon the valid data byte locations of the words) have been written into the PCI FIFO 110, or when the remaining number of bytes in the data transfer transaction in progress (e.g., a fly-by DMA read or write operation) have been written into the PCI FIFO 110.

When data is being transferred to the PCI-bus 108, such as in a fly-by write operation, the control logic 201 initiates transfer of the multi-byte words from the PCI FIFO 110 to the PCI-bus 108 in one or more burst transfers individually conducted while a constant byte enable vector is being communicated to the PCI-bus 108 by the control logic 201 through the PCI-bus interface unit 112. In this case, if the first multi-byte word contains less than a full multi-byte word, the control logic 201 initiates transfer of the first multi-byte word in a single word burst from the PCI FIFO 110 while a byte enable vector indicating that less than a full multi-byte word is being communicated, is being provided to the PCI-bus 108. Likewise, if the last multi-byte word to be transferred contains less than the full multi-byte word, the control logic 201 initiates transfer of the last multi-byte word in a single word burst from the PCI FIFO 110 while a byte enable vector indicating that less than the full multi-byte word is being communicated, is being provided to the PCI-bus 108. Otherwise, the control logic 201 initiates transfer of up to the number of words to be transferred, in one or more burst transfers from the PCI FIFO 110 while a constant byte enable vector indicating that full multi-byte words are being communicated, is provided to the PCI-bus 108. In all cases, initiation of the burst transfers involve providing the appropriate signals to the PCI-bus interface unit 112 so that the PCI-bus interface unit 112 provides the burst transfers of data to the PCI-bus 108.

Communications between the PCI-side aligner unit 107 and the PCI FIFO 110 are preferably performed according to a first clock signal CLK1 that is generated by the control logic 201 to be synchronous with the local bus clock signal that it receives directly from the local bus 104. As previously described, such communications of data between the PCI-side aligner unit 107 and the PCI FIFO 110 are managed on a byte-at-a-time basis. Communications between the PCI FIFO 110 and the PCI-bus interface unit 112, on the other hand, are preferably performed according to a second clock signal CLK2 that is generated by the control logic 201 to be synchronous with the PCI-bus clock signal that it receives indirectly through the PCI-bus interface unit 112 from the PCI-bus 108. Such communications of data between the PCI-bus interface unit 112 and the PCT FIFO 110 are also managed on a byte-at-a-time basis.

Although the PCI FIFO 110 is represented as a single block in the figures, in the preferred embodiment of the invention, the PCI FIFO 110 comprises an output FIFO for data being transferred to the PCI-bus 108 from the memory 102 and an input FIFO for data being transferred from the PCI-bus 108 to the memory 102. In this case, for each of the directional FIFO's, a corresponding set of registers is also included for FIFO management purposes.

Figure 3:
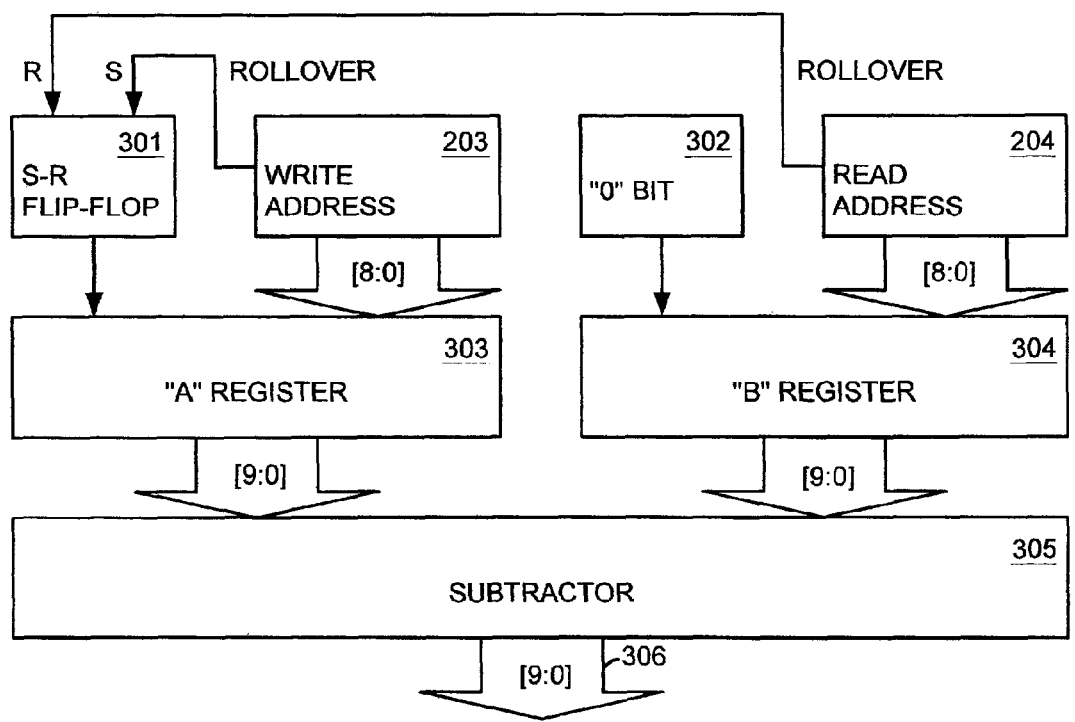
FIG. 3 illustrates, as an example, a block diagram including #Bytes logic utilizing aspects of the present invention.

FIG. 3 illustrates, as an example, a block diagram of the #Bytes logic 202 along with the pointer registers 203 and 204, configured for performing a fly-by DMA write operation. Both pointer registers 203 and 204 generate a rollover indication when their contents (e.g., the write pointer in this case for register 203 and the read pointer for register 204) rollover from their maximum count values back to zero. The maximum count values in this case also indicate the size of the PCI FIFO 110. In particular, the maximum number of bytes that can be stored in the PCI FIFO 110 in this example equals 256 (or 64 4-byte words), therefore, the maximum count value for each of the registers 203 and 204 is equal to 255, as indicated by the 8-bit address "11111111", and a minimum count value for each of the registers 203 and 204 is equal to 0, as indicated by the 8-bit address "00000000", so as to provide a range of 256 count values.

An S-R flip-flop 301 in the #Bytes logic 201 has a set input "S" coupled to the rollover indication generated by the register 203 containing the write pointer, and a reset input "R" coupled to the rollover indication generated by the register 204 containing the read pointer. Consequently, each time the S-R flip-flop 301 is set by the register 203 containing the write pointer rolling over, its output provides a "1", and each time the S-R flip-flop 301 is reset by the register 204 containing the read pointer rolling over, its output provides a "0". In contrast, a storage cell 302 has an output that provides a fixed "0" value.

An "A" register 303 has its least significant bit inputs (i.e., bits 0–8) coupled to the outputs of the register 203 indicating in this case the byte address of the PCI FIFO 110 that the write pointer is currently pointing to, and in its next most significant bit input (i.e., bit 9) coupled to the output of the S-R flip-flop 301. These inputs are then latched to the outputs of the "A" register 303, in response to, for example, the clock signal CLK1 generated by the control logic 201. Similarly, a "B" register 304 has its least significant bit inputs (i.e., bits 0–8) coupled to the outputs of the register 204 indicating in this case the byte address of the PCI FIFO 110 that the read pointer is currently pointing to, and in its next most significant bit input (i.e., bit 9) coupled to the output of the storage cell 302. These inputs are then latched to the outputs of the "B" register 304, in response to, for example, the clock signal CLK2 generated by the control logic 201.

A subtractor unit 305 has a first set of inputs coupled to the outputs of the "A" register 303, a second set of inputs coupled to the outputs of the "B" register 304, and outputs 306 providing a difference between the two values represented by the two sets of inputs.

Consequently, the outputs 306 indicate the number of unread stored bytes in the PCI FIFO 110 taking into account write pointer rollover and possible write pointer/read pointer wrap-around.

To accommodate a fly-by DMA read operation, the block diagram of FIG. 3 is modified so that the pointer registers 203 and 204 effectively reverse positions. Such reversal is necessary, because the pointer register 204 in that case contains the write pointer and the register 203 contains the read pointer. One structure to implement such configurations for fly-by DMA write and read operations includes in addition to the elements shown in FIG. 3, four additional mulitplexers. Each of the added multiplexers include inputs that are selected by the type of fly-by DMA operation being performed at the time. A first multiplexer provides the set input to the S-R flip-flop 301. It has the rollover indications from the pointer registers 203 and 204 as inputs, and a select input that selects the rollover indication from pointer register 203 if a fly-by DMA write operation is being performed or the rollover indication from pointer register 204 if a fly-by DMA read operation is being performed. A second multiplexer provides the reset input to the S-R flip-flop 301. It also has the rollover indications from the pointer registers 203 and 204 as inputs, but its select input selects the rollover indication from pointer register 204 if a fly-by DMA write operation is being performed or the rollover indication from pointer register 203 if a fly-by DMA read operation is being performed.

A third multiplexer provides the least significant bits (i.e., 8:0) to the "A" register 303. It has the outputs of the pointer registers 203 and 204 as inputs, and a select input that selects the outputs of the pointer register 203 if a fly-by DMA write operation is being performed or the outputs of the pointer register 204 if a fly-by DMA read operation is being performed. A fourth multiplexer provides the least significant bits (i.e., 8:0) to the "B" register 304. It also has the outputs of the pointer registers 203 and 204 as inputs, but its select input selects the outputs of the pointer register 204 if a fly-by DMA write operation is being performed or the outputs of the pointer register 203 if a fly-by DMA read operation is being performed.

Alternatively, to accommodate a fly-by DMA read operation, the block diagram of FIG. 3 is modified to include another identically structure circuit except with the pointer registers 203 and 204 in reverse positions. Such an alternative implementation is preferable for performance and simplicity in construction and control purposes.

The output of the #Bytes logic 202 is also used to request the bus 104 for fly-by DMA read or write operations. As a particular example, the bus 104 is assumed to operate much faster than the PCI-bus 108. For a fly-by DMA read operation in this case, the output of the #Bytes logic 202 initiates data transfer from the PCI FIFO 110 to the bus 104 after 64 bytes have been written into the PCI FIFO 110 from the PCI-bus 108. On the other hand, for a fly-by DMA write operation, the output of the #Bytes logic 202 initiates data transfer from the bus 104 to the PCI FIFO 110 whenever there is space of 64 bytes left available in the PCI FIFO 110 for writing to (e.g., output of the #Bytes logic 202 indicates a count value less than 192 for the 256 byte PCI FIFO 110). For data transfers between the PCI FIFO 110 and the PCI-bus 108, however, the output of the #Bytes logic 202 initiates data transfer from the PCI FIFO 110 to the PCI-bus 108 whenever there is unread data in the PCI FIFO 110, and from the PCI-bus 108 to the PCI FIFO 110 whenever there is available space in the PCI FIFO 110.

Although the various aspects of the present invention have been described with respect to a preferred embodiment, it will be understood that the invention is entitled to full protection within the full scope of the appended claims.

I claim:

1. An apparatus for transferring multi-byte words in a flyby DMA operation, comprising:

FIFO coupled to a memory and a PCI-bus such that multi-byte words transferred between said memory and said PCI-bus are buffered by said FIFO;

first register storing a first write pointer to a next available byte location to be written to in said FIFO when said multi-byte words are being transferred from said memory to said PCT-bus, and a first read pointer to a next available byte location to be read from in said FIFO when said multi-byte words are being transferred to said memory from said PCI-bus;

second register storing a second read pointer to a next available byte location to be read from in said FIFO when said multi-byte words are being transferred from said memory to said PCI-bus, and a second write pointer to a next available byte location to be written to in said FIFO when said multi-byte words are being transferred to said memory from said PCI-bus; and control logic configured to manage transfer of said multi-byte words to and from said buffer, shift said first write pointer and said first read pointer to match a starting byte address of a first multi-byte word at the beginning of a fly-by DMA operation from said memory to said PCI-bus, and shift said second write pointer and said second read pointer to match a starting byte address of a first multi-byte word at the beginning of a fly-by DMA operation to said memory from said PCI-bus.

2. The apparatus according to claim 1, wherein said control logic is further configured to manage a burst transfer of such multi-byte words from said FIFO.

3. The apparatus according to claim 1, wherein said control logic is further configured to initiate one or more burst transfers of said multi-byte words stored in said FIFO only after at least a first number of bytes of said multi-byte words have been stored in said FIFO during a fly-by DMA operation.

4. The apparatus according to claim 1, wherein said control logic is further configured to initiate transfer of multi-byte words between said FIFO and a local bus interposed between said memory and said FIFO synchronous with a first clock signal provided by said local bus, and initiate transfer of multi-byte words between said FIFO and said PCI-bus synchronous with a second clock signal provided by said PCI-bus.

5. The apparatus according to claim 2, wherein said control logic is further configured to initiate transfer of said multi-byte words from said FIFO to said PCI-bus in one or more burst transfers individually conducted while a constant byte enable vector is being communicated to said PCI-bus.

6. The apparatus according to claim 3, wherein said first number of bytes is 64 bytes.

7. The apparatus according to claim 3, further comprising:

count register coupled to said control logic for storing the number of bytes of said multi-byte words stored in said FIFO when said one or more burst transfers is initiated by said control logic; and counter register coupled to said control logic for counting the number of bytes of multi-byte words subsequently stored in said FIFO after said one or more burst transfers is initiated by said control logic;

wherein said control logic is further configured to initiate another one or more burst transfers of said multi-byte words subsequently stored in said FIFO only after contents of said count register and said counter register sum to at least a second number of bytes.

8. The apparatus according to claim 4, wherein said first clock signal and said second clock signal are asynchronous.

9. The apparatus according to claim 5, wherein said control logic is further configured to initiate transfer of said first multi-byte word in a single word burst transfer from said FIFO while a byte enable vector is being provided to said PCI-bus that indicates that less than a full multi-byte word is being communicated, if said first multi-byte word contains less than a full multi-byte word.

10. The apparatus according to claim 7, wherein said second number of bytes is 128 bytes.

11. The apparatus according to claim 9, wherein said control logic is further configured to initiate transfer of a last multi-byte word to be transferred between said memory and said PCI-bus during a fly-by DMA operation, in a single word burst transfer from said FIFO while a byte enable vector is being provided to said PCI-bus that indicates that less than said full multi-byte word is being communicated, if said last multi-byte word contains less than a full multi-byte word.

12. The apparatus according to claim 11, wherein said control logic is further configured to initiate transfer of all multi-byte words in said fly-by DMA operation, other than said first multi-byte word and said last multi-byte word, in one or more burst transfers from said FIFO while a constant byte enable vector is being provided to said PCI-bus that indicates that full multi-byte words are being communicated.

13. A method for transferring multi-byte words, comprising:

receiving one or more multi-byte words and a first clock signal from a first bus configured to communicate on a word-at-a-time basis;

writing said one or more multi-byte words into a FIFO managed on a byte-at-a-time basis synchronous with said first clock signal;

reading said one or more multi-byte words from said FIFO managed on a byte-at-a-time basis synchronous with a second clock signal received from a second bus; and transmitting said one or more multi-byte words to said second bus on a word-at-a-time basis.

14. The method according to claim 13, wherein said first clock signal and said second clock signal are asynchronous.

15. The method according to claim 13, further comprising:

shifting a read pointer and a write pointer to match a starting byte address associated with a first of said one or more multi-byte words to be transferred from said first bus to said second bus;

incrementing said write pointer by one byte address each time a byte of said one or more multi-byte words is written into said FIFO; and incrementing said read pointer by one byte address each time a byte of said one or more multi-byte words is read from said FIFO.

16. The method according to claim 13, wherein said transmitting said one or more multi-byte words to said second bus comprises performing one or more burst transfers of said multi-byte words stored in said FIFO only after at least a preselected number of bytes of said multi-byte words have been stored in said FIFO.

17. The method according to claim 13, wherein said first bus is a PCI-bus, and further comprising transmitting said one or more bytes to a memory through said second bus in a DMA fly-by read operation.

18. The method according to claim 13, wherein said receiving one or more multi-byte words and said first clock signal comprises receiving said one or more multi-byte words from a memory through said first bus during a DMA fly-by write operation.

19. The method according to claim 18, wherein said transmitting said one or more multi-byte words to said second bus on a word-at-a-time basis, comprises transmitting said multi-byte words from said FIFO to a PCI-bus in one or more burst transfers individually conducted while a constant byte enable vector is being provided to said PCI-bus.

20. The method according to claim 19, wherein said transmitting said multi-byte words from said FIFO to said PCT-bus includes transmitting a first multi-byte word of said one or more multi-byte words in a single burst transfer from said FIFO along with a byte enable vector indicating that less than a full multi-byte word is being transmitted, if said first multi-byte word contains less than a full multi-byte word.

21. The method according to claim 20, wherein said transmitting said multi-byte words from said FIFO to said PCI-bus includes transmitting a last multi-byte word of said one or more multi-byte words in a single burst transfer from said FIFO along with a byte enable vector indicating that less than a full multi-byte word is being transmitted, if said last multi-byte word contains less than said full multi-byte word.

22. The method according to claim 21, wherein said transmitting said multi-byte words from said FIFO to said PCI-bus includes transmitting other than said first multi-byte word and said last multi-byte word in one or more burst transfers from said FIFO along with a byte enable vector indicating that full multi-byte words are being transmitted.

\* \* \* \* \*